(12) United States Patent
Beebe

(10) Patent No.: US 9,465,174 B2
(45) Date of Patent: Oct. 11, 2016

(54) FIBER OPTIC CONNECTOR ASSEMBLY JIG

(71) Applicant: Fishman Corporation, Hopkinton, MA (US)

(72) Inventor: W. Scott Beebe, Berkley, MA (US)

(73) Assignee: Fishman Corporation, Hopkinton, MA (US)

( * ) Notice: Subject to any disclaimer, the term of this patent is extended or adjusted under 35 U.S.C. 154(b) by 0 days.

(21) Appl. No.: 14/851,760

(22) Filed: Sep. 11, 2015

(65) Prior Publication Data

US 2016/0077290 A1    Mar. 17, 2016

Related U.S. Application Data

(60) Provisional application No. 62/049,570, filed on Sep. 12, 2014.

(51) Int. Cl.
    *G02B 6/38*    (2006.01)

(52) U.S. Cl.
    CPC ........... *G02B 6/3898* (2013.01); *G02B 6/3817* (2013.01); *G02B 6/3861* (2013.01); *G02B 6/3897* (2013.01); *G02B 6/3893* (2013.01)

(58) Field of Classification Search
    CPC .... G02B 6/38; G02B 6/3817; G02B 6/3839; G02B 3/389; G02B 6/3878; G02B 6/3893; G02B 6/3897; G02B 6/3898; G02B 6/42; G02B 6/3861; G02B 3/3878

USPC ................... 385/53, 59, 75–79, 89, 138–139
See application file for complete search history.

(56) References Cited

U.S. PATENT DOCUMENTS

| | | | |
|---|---|---|---|
| 4,597,631 A * | 7/1986 | Flores ................. | G02B 6/3817 385/53 |
| 5,920,670 A | 7/1999 | Lee et al. | |
| 2012/0252242 A1 | 10/2012 | Beebe | |
| 2013/0177279 A1 | 7/2013 | Nelson | |

OTHER PUBLICATIONS

International Search Report mailed in related application No. PCT/US2015/049712 Dec. 17, 2015.

* cited by examiner

*Primary Examiner* — Akm Enayet Ullah
*Assistant Examiner* — Michael Mooney
(74) *Attorney, Agent, or Firm* — Mark H. Whittenberger; Michael T. Abramson; Holland & Knight LLP

(57) ABSTRACT

A fiber optic connector assembly jig may comprise a base configured to carry a set of fiber optic connectors. A set of alignment elements may be carried by the base, where each alignment element of the set of alignment elements may define an opening, where each opening may be configured to center a corresponding fiber optic connector of the set of fiber optic connectors with a longitudinal axis of the opening.

20 Claims, 17 Drawing Sheets

FIBER OPTIC CONNECTOR ASSEMBLY JIG

RELATED CASES

This application claims the benefit of U.S. Provisional Application No. 62/049,570, filed on 12 Sep. 2014, the contents of which are all incorporated by reference.

BACKGROUND

Networks, such as fiber optic networks, may include numerous optical connection points. Conventional fiber optic networks may use small-form factor (SFF) optical fiber connectors to provide mechanical coupling of optical fibers. For example, Lucent Connector (LC) fiber optic connectors may be used for joining optical fiber segments at their ends and for connecting optical fiber cables to active and passive devices. LC fiber optic connectors typically may use epoxy-based resins (e.g., two part epoxies) for fiber retention within a ferrule portion of the connector. These epoxies may require, e.g., about 10 to 15 minutes, to heat cure after application. Once set, the fiber generally may not be removed from the ferrule without breaking the fiber.

BRIEF SUMMARY OF DISCLOSURE

In one example implementation, a fiber optic connector assembly jig may include but is not limited to a base configured to carry a set of fiber optic connectors. A set of alignment elements may be carried by the base, where each alignment element of the set of alignment elements may define an opening, where each opening may be configured to center a corresponding fiber optic connector of the set of fiber optic connectors with a longitudinal axis of the opening.

One or more of the following example features may be included. The base may include a first portion defining the opening and a second portion defining a second opening. A base plate may be included, wherein the base may be configured to interact with the base plate to align the corresponding fiber optic connector relative to an injection device. The base may include one or more alignment portions configured to mate with at least one of the alignment elements to align the corresponding fiber optic connector relative to the injection device. The base plate may include a keying element configured to insert within a corresponding key element opening defined by the base. The at least one of the alignment elements may include a housing defining a channel extending along a vertical axis of the at least one of the alignment elements. The at least one of the alignment elements may include a housing defining a set of openings which extend along a longitudinal axis of the at least one of the alignment elements. At least one opening of the set of openings may define one of a bevel and taper extending from a face of the at least one of the alignment elements toward the corresponding fiber optic connector. At least one opening of the set of openings may define one of a bevel and taper sized and shaped to receive a tip portion of the corresponding fiber optic connector. The base may include opposing sets of posts configured to insert within corresponding mounting openings defined by the set of alignment elements.

In another example implementation, a fiber optic connector assembly jig may include but is not limited to a base configured to carry a set of fiber optic connectors. A base plate may be included, wherein the base may be configured to interact with the base plate to align the corresponding fiber optic connector relative to an injection device, wherein the base may include one or more alignment portions configured to mate with at least one of the alignment elements to align the corresponding fiber optic connector relative to the injection device.

One or more of the following example features may be included. The base may include a first portion defining the opening and a second portion defining a second opening. A base plate may be included, wherein the base may be configured to interact with the base plate to align the corresponding fiber optic connector relative to an injection device. The base plate may include a keying element configured to insert within a corresponding key element opening defined by the base. The at least one of the alignment elements may include a housing defining a channel extending along a vertical axis of the at least one of the alignment elements. The at least one of the alignment elements may include a housing defining a set of openings which extend along a longitudinal axis of the at least one of the alignment elements. At least one opening of the set of openings may define one of a bevel and taper extending from a face of the at least one of the alignment elements toward the corresponding fiber optic connector. At least one opening of the set of openings may define one of a bevel and taper sized and shaped to receive a tip portion of the corresponding fiber optic connector. The base may include opposing sets of posts configured to insert within corresponding mounting openings defined by the set of alignment elements.

In another example implementation, fiber optic connector manufacturing process may include but is not limited to carrying, by a base, a set of fiber optic connectors. The base may carry a set of alignment elements. Each alignment element of the set of alignment elements may define an opening. Each opening may be aligned with a corresponding fiber optic connector of the set of fiber optic connectors with a longitudinal axis of the opening. A needle associated with an injector device may be aligned relative to the opening of a set of alignment elements. A material for fiber retention may be injected from the needle associated with the injector device in the opening.

One or more of the following example features may be included. Aligning, by each opening, the corresponding fiber optic connector of the set of fiber optic connectors with the longitudinal axis of the opening may include aligning, by each opening, a longitudinal axis of a fiber optic connector ferrule for the corresponding fiber optic connector with a longitudinal axis of the needle associated with the injector device. A pin from a preform assembly may be extended into the fiber optic connector ferrule for the corresponding fiber optic connector. The base may include a first portion defining the opening and a second portion defining a second opening. A base plate may be included, wherein the base may be configured to interact with the base plate to align the corresponding fiber optic connector relative to an injection device. The base plate may include a keying element configured to insert within a corresponding key element opening defined by the base. The at least one of the alignment elements may include a housing defining a channel extending along a vertical axis of the at least one of the alignment elements. The at least one of the alignment elements may include a housing defining a set of openings which extend along a longitudinal axis of the at least one of the alignment elements. At least one opening of the set of openings may define one of a bevel and taper extending from a face of the at least one of the alignment elements toward the corresponding fiber optic connector. At least one opening of the set of openings may define one of a bevel and taper sized and shaped to receive a tip portion of the corresponding fiber optic connector.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
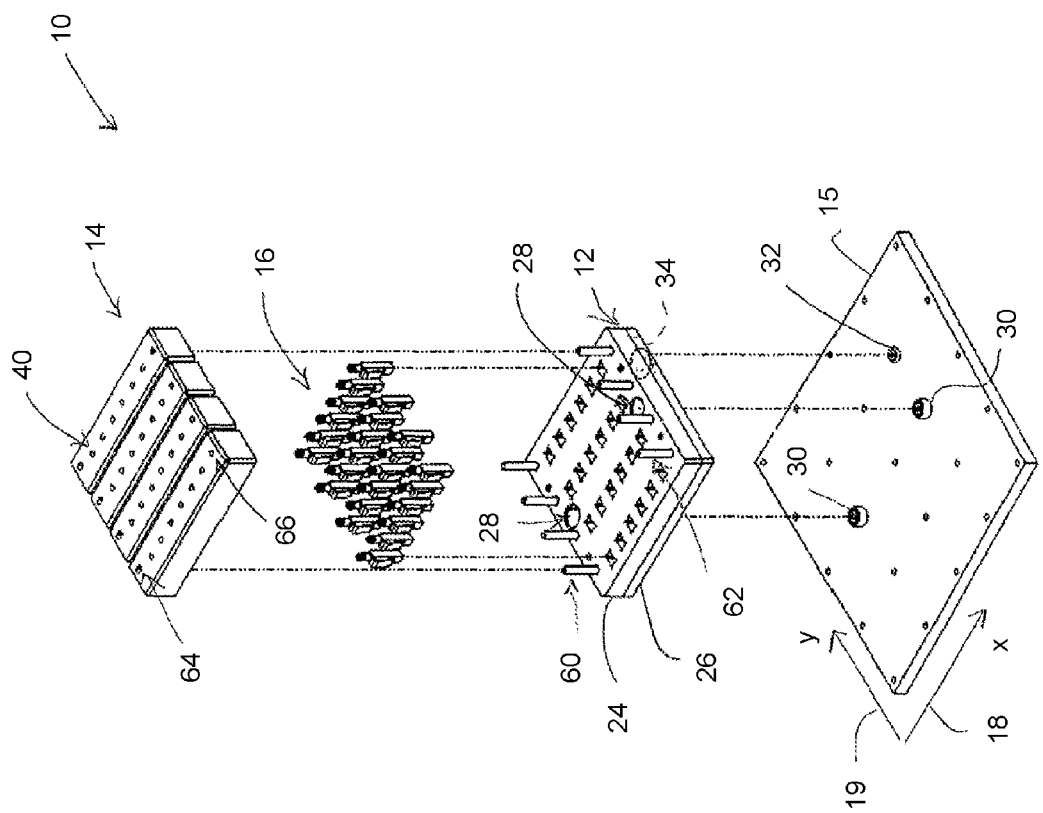
FIG. 1 is an example diagrammatic view of a fiber optic connector assembly jig, according to one or more example implementations of the disclosure.

As discussed above, networks, such as fiber optic networks, may include numerous optical connection points. The manufacture of fiber optic connectors may suffer from one or more example deficiencies. Conventional fiber optic networks may use small-form factor (SFF) optical fiber connectors to provide mechanical coupling of optical fibers. For example, Lucent Connector (LC) fiber optic connectors may be used for joining optical fiber segments at their ends and for connecting optical fiber cables to active and passive devices. During the manufacturing process, LC fiber optic connectors typically may use epoxy-based resins (e.g., two part epoxies) for fiber retention within a ferrule portion of the connector. These epoxies may require, e.g., about 10 to 15 minutes, to heat cure after application. Once set, the fiber generally may not be removed from the ferrule without breaking the fiber. The ferrules may typically be filled with epoxy by hand. This filling process may lead to the manufacturer injecting imprecise amounts of epoxy into the ferrule, which may can lead to quality control issues.

For example, if the manufacturer fills the ferrule with too small a volume of epoxy, the fiber optic element may not bond completely to the ferrule, which may lead to the fiber optic element becoming detached from the fiber optic connector during use. As another example, if the manufacturer fills the ferrule with too large a volume of epoxy, the epoxy may leak outside of the ferrule and onto other portions of the connector. Such over injection may waste epoxy and the leakage may lead to the fiber optic connector being unusable.

In some implementations, to address the example disadvantages raised by manual injection of epoxy into the ferrule, it may be possible for a manufacturer to utilize a robotic injector device to load the fiber optic connector ferrules with an accurate and repeatable amount of epoxy. However, fiber optic connector ferrules may, generally, not be configured as purely cylindrical structures. Instead, since the ferrules are manufactured from a substantially thin-walled compliant material, the ferrules may define an oblong or oval cross-sectional structure. With this geometry, as a robotic injector device disposes a needle into the fiber optic connector, the needle may contact and compress the ferrule walls. With the needle further misshaping the ferrule wall, any subsequent injection of epoxy into the ferrule may lead to leakage of the epoxy within the fiber optic connector.

As will be discussed in greater detail below, by contrast to conventional fiber optic connector manufacturing techniques, one or more implementations of the disclosure may relate to manufacturing of fiber optic connector assemblies using, e.g., one or more aspects of a fiber optic connector assembly jig. In some implementations, the fiber optic assembly jig may include a base configured to align a set of fiber optic connectors with a base plate of an injector device, such as a robotically (and/or manually) controlled injector device. In some implementations, the fiber optic assembly jig may also include a set of one or more alignment manifolds (e.g., alignment elements) that may be configured to substantially align a longitudinal axis of the fiber optic connector ferrules with a longitudinal axis of a needle associated with the injector device. In some implementations, by aligning the fiber optic connectors to the injector device base plate, and by aligning the longitudinal axis of the ferrules to that of the needle, the fiber optic assembly jig may enable a manufacturer to automatically (or manually) fill the ferrules of a set of fiber optic connectors in a precise and repeatable manner. Accordingly, the fiber optic connector assembly jig may, in some implementations, minimize waste and may increase production volume of fiber optic connectors.

As discussed above and referring also at least to FIGS. 1-17, a fiber optic connector assembly jig (e.g., fiber optic connector assembly jig 10) may include but is not limited to a base (e.g., base 12) configured to carry a set of fiber optic connectors (e.g., fiber optic connectors 16). A set of alignment elements (e.g., alignment elements 14) may be carried by the base, where each alignment element of the set of alignment elements may define an opening (e.g., opening 20), where each opening may be configured to center a corresponding fiber optic connector of the set of fiber optic connectors with a longitudinal axis (e.g., longitudinal axis 42) of the opening.

In some implementations, a fiber optic connector assembly jig (e.g., fiber optic connector assembly jig 10) may include but is not limited to a base (e.g., base 12) configured to carry a set of fiber optic connectors (e.g., fiber optic connectors 16). For example, and referring at least to one or more aspects of FIGS. 1-17 (and in particular, FIGS. 1, 2, and 6) an exploded and assembled view of an example fiber optic connector assembly jig 10, is shown. The fiber optic connector assembly jig 10 may be configured to carry (e.g., mount, hold, etc.) set of fiber optic connectors 16 to a base plate (e.g., base plate 15), where base plate 15 may form part of an injection device, such as known robotically (and/or manually) controlled injection devices.

In some implementations, a set of alignment elements (e.g., alignment elements 14) may be carried by base 12, where each alignment element of the set of alignment elements may define an opening (e.g., opening 20), where each opening may be configured to center a corresponding fiber optic connector of the set of fiber optic connectors with a longitudinal axis (e.g., longitudinal axis 42) of the opening. While fiber optic connector assembly jig 10 may be configured in a variety of ways, in some implementations, fiber optic connector assembly jig 10 may include base 12 and set of one or more alignment elements 14 carried by base 12.

In some implementations, base 12 may be configured to hold or carry set of fiber optic connectors 16, such as the above-noted LC fiber optic connectors, in a (substantially) secure manner. For example, with reference at least to FIG. 4, base 12 may define a first set of openings (e.g., opening 20) sized and shaped to receive the housings of corresponding fiber optic connectors 16. Further, with reference at least to FIGS. 9 and 10, base 12 may define a second set of openings (e.g., opening 22) sized and shaped to receive rear pins associated with corresponding fiber optic connectors 16. It will be appreciated that while base 12 is shown to contain four rows of six fiber optic connectors 16, base 12 may be configured to hold any number of fiber optic connectors 16 in any pattern. As such, the use of four rows of six fiber optic connectors 16 should be taken as example only and not to limit the scope of the disclosure.

In some implementations, base 12 may include a first portion (e.g., first base portion 24) defining opening 20 and a second portion (e.g., second base portion 26) defining a second opening (e.g., second opening 22). For example, base 12 may be manufactured as an assembly of components. For instance, base 12 may include first base portion 24 that may define a first set of openings (e.g., opening 20) and a separate second base portion 26 that may define a second set of openings (e.g., opening 22). The use of first and second base portions 24, 26 may allow relative ease of forming the openings in base 12. It will be appreciated that base 12 may be a single component with openings 20 and 22.

In some implementations, a base plate (e.g., base plate 15) may be included, wherein base 12 may be configured to interact with base plate 15 to align the corresponding fiber optic connector relative to an injection device. For example, base 12 may be configured to interact with base plate 15 to align set of fiber optic connectors 16 relative to the above-noted injection device in a (substantially) repeatable manner. In some implementations, base 12 may include one or more alignment portions (e.g., alignment portions 28) configured to mate with at least one of the alignment elements to align the corresponding fiber optic connector relative to the injection device. For example, and referring at least to FIGS. 3 and 4, to help maintain alignment of fiber optic connector assembly jig 10 to X-Y axes 18, 19 of the injection device, base 12 may include alignment portions 28, such as openings defined by base 12, configured to mate with alignment elements 30, such as cylindrical protrusions, of base plate 15. Mating of alignment portions 28 and alignment cylinders 30 may minimize shifting of base 12 relative to X-Y axes 18, 19 of the injection device during operation. In some implementations, interaction between alignment portions 28 and alignment elements 30 may maintain repeatable positioning of different jig bases 12, and the corresponding fiber optic connectors 16, relative to base plate 15 and to the injection device.

In some implementations, base plate 15 may include a keying element (e.g., keying element 32) configured to insert within a corresponding key element opening (e.g., opening 34) defined by base 12. For example, base 12 may be configured to interact with base plate 15 to maintain consistent orientation of fiber optic connectors 16 relative to X-Y axes 18, 19 of the injection device when, e.g., a manufacturer disposes base 12 on base plate 15. For example, and referring at least to FIGS. 1 and 3, base plate 15 may include keying element 32 configured to insert within a corresponding (key element) opening (e.g., opening 34) defined by base 12. Interaction between keying element 32 and the opening may provide for mounting of base 12 relative to base plate 15 in a single orientation. This may allow for consistent positioning (e.g., aligning, centering, etc.) of fiber optic connectors 16 relative to the injection device during a ferrule filling procedure.

In some implementations, the at least one of the alignment elements may include a housing (e.g., housing 44) defining a set of openings (e.g., openings 40) which may extend along a longitudinal axis (e.g., longitudinal axis 42) of the at least one of the alignment elements. In some implementations, the at least one of the alignment elements may include a housing (e.g., housing 44) defining a channel (e.g., channel 46) extending along a vertical axis (e.g., vertical axis 48) of the at least one of the alignment elements. For example, and referring at least to FIG. 1, alignment elements 14 of the fiber optic connector assembly jig 10 may be configured to provide a longitudinal alignment between fiber optic connectors 16 and a needle of the injector device. For example, and referring at least to FIGS. 6 and 7, each alignment element 14 may include housing 44 that may define channel 46 extending along vertical axis 48 of alignment element 14. Channel 46 may be configured to enclose and contain at least a portion of the fiber optic connectors carried by base 12. Further, each housing 44 may define set of openings 40, which may extend along longitudinal axis 42 of alignment element 14. Openings 40 may be configured to provide fluid (e.g., epoxy) communication between the needle of the injector device and a ferrule (e.g., ferrule 56) of corresponding fiber optic connector 16.

In some implementations, at least one opening of the set of openings (e.g., openings 40) may define one of a bevel and taper (e.g., bevel/taper 50) sized and shaped to receive a tip portion (e.g., tip portion 54) of the corresponding fiber optic connector. For example, each opening 40 may be configured to center or align corresponding fiber optic connector 16 with the longitudinal axis of opening 40. For instance, and referring at least to FIGS. 8 and 11, each opening 40 may define a bevel or taper 50 sized and shaped to receive a tip portion (e.g., tip portion 54) of fiber optic connector 16. In some implementations, as an assembler lowers alignment element 14 onto base 12, taper 50 of opening 40 may engage tip portion 54 of fiber optic connector 16 to (substantially) align (e.g., center) longitudinal axis 52 of tip portion 54 and ferrule 56 with the longitudinal axis of opening 50.

In some implementations, at least one opening of the set of openings (e.g., openings 40) may define one of a bevel and taper (e.g., bevel/taper 58) extending from a face (e.g., face 60) of the at least one of the alignment elements toward the corresponding fiber optic connector. For example, each opening 40 may define bevel or taper 58 extending from a face (e.g., face 60) of alignment element 14 toward fiber optic connector 16. Bevel 58 may be configured to guide the needle of the injector device toward ferrule 56, e.g., to minimize compression of ferrule 56 by the needle during an injection procedure.

Figure 2:
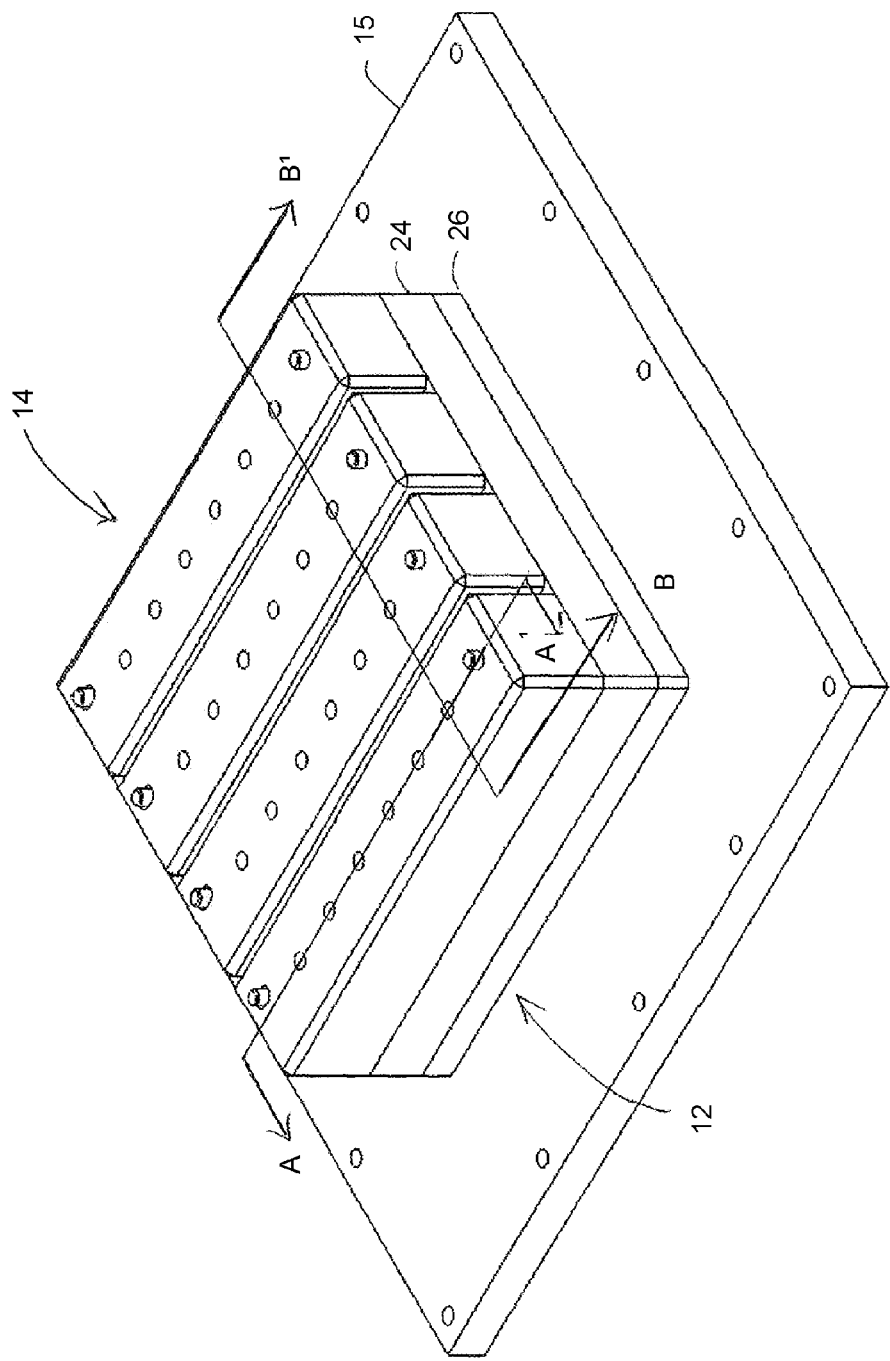
FIG. 2 is an example diagrammatic view of the fiber optic assembly jig of FIG. 1, according to one or more example implementations of the disclosure.
Figure 3:
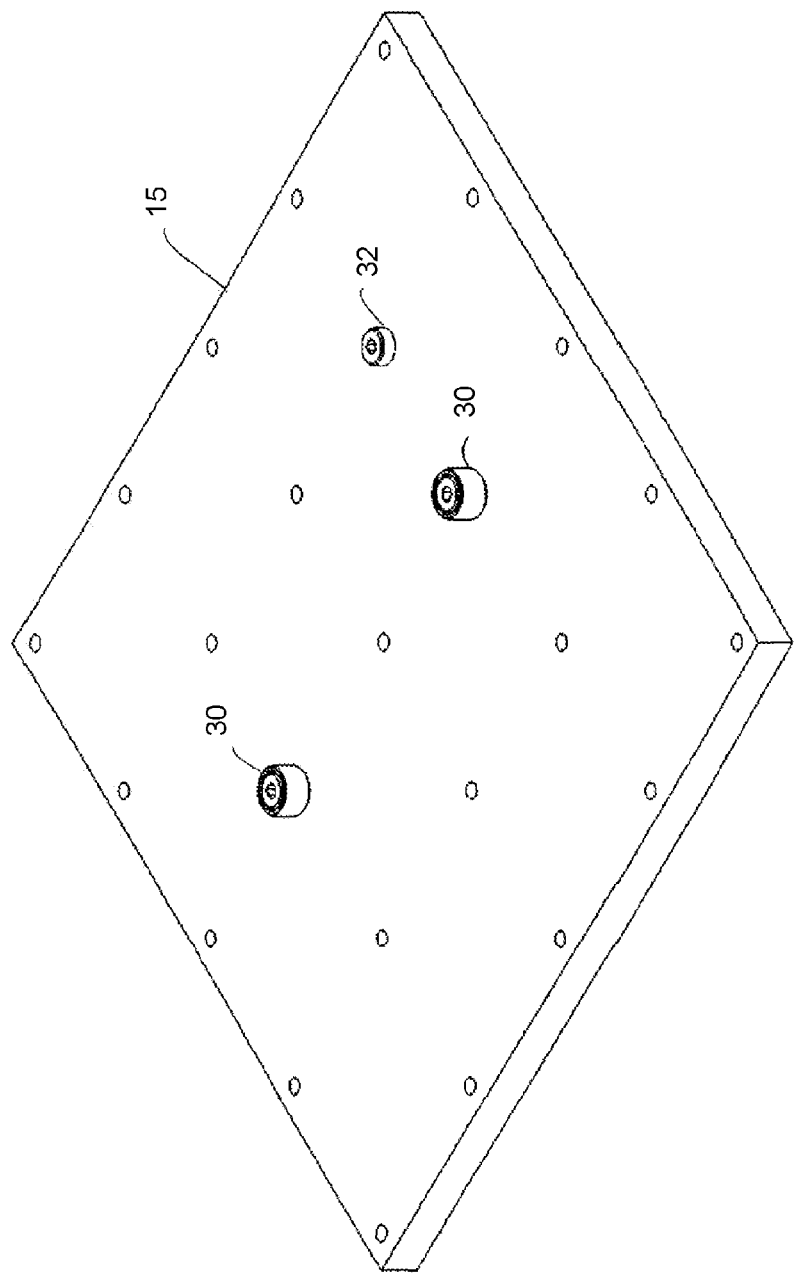
FIG. 3 is an example diagrammatic view of a base plate of the injector device of FIG. 1 having alignment elements, according to one or more example implementations of the disclosure.
Figure 4:
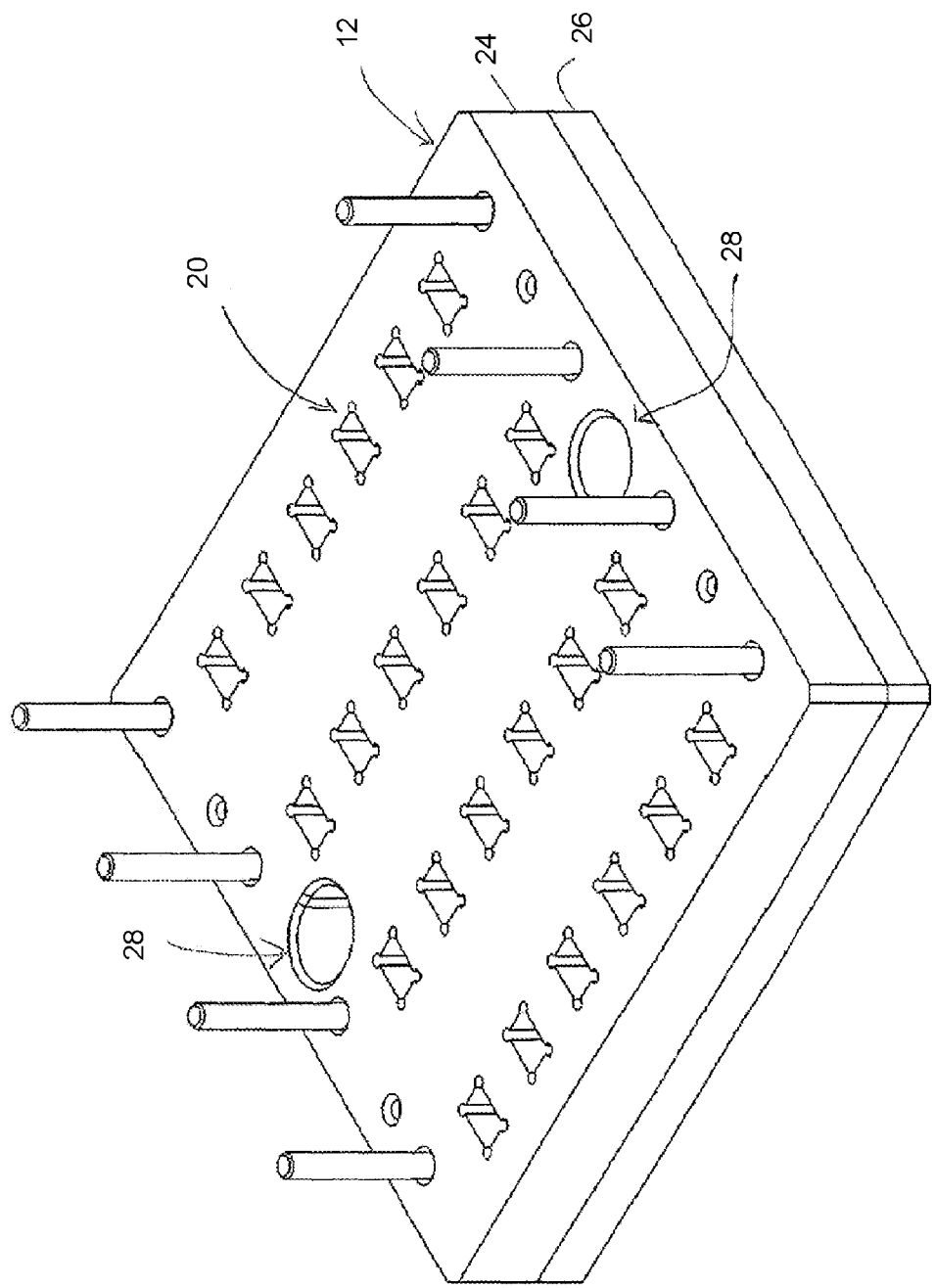
FIG. 4 is an example diagrammatic view of a base of the fiber optic connector assembly of FIG. 1, according to one or more example implementations of the disclosure.
Figure 5:
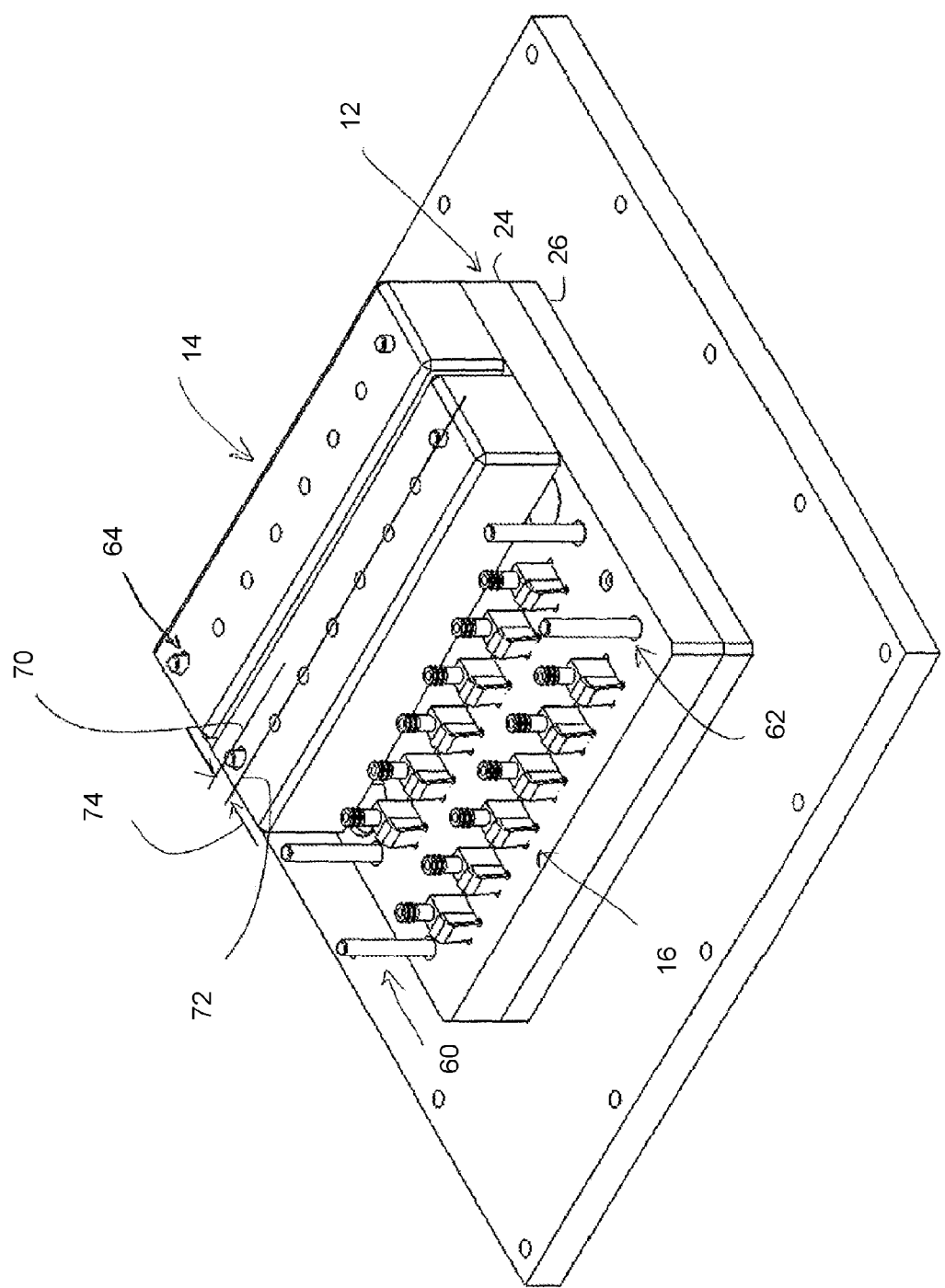
FIG. 5 is an example diagrammatic partially assembled perspective view of the example fiber optic assembly jig of FIG. 1, according to one or more example implementations of the disclosure.
Figure 6:
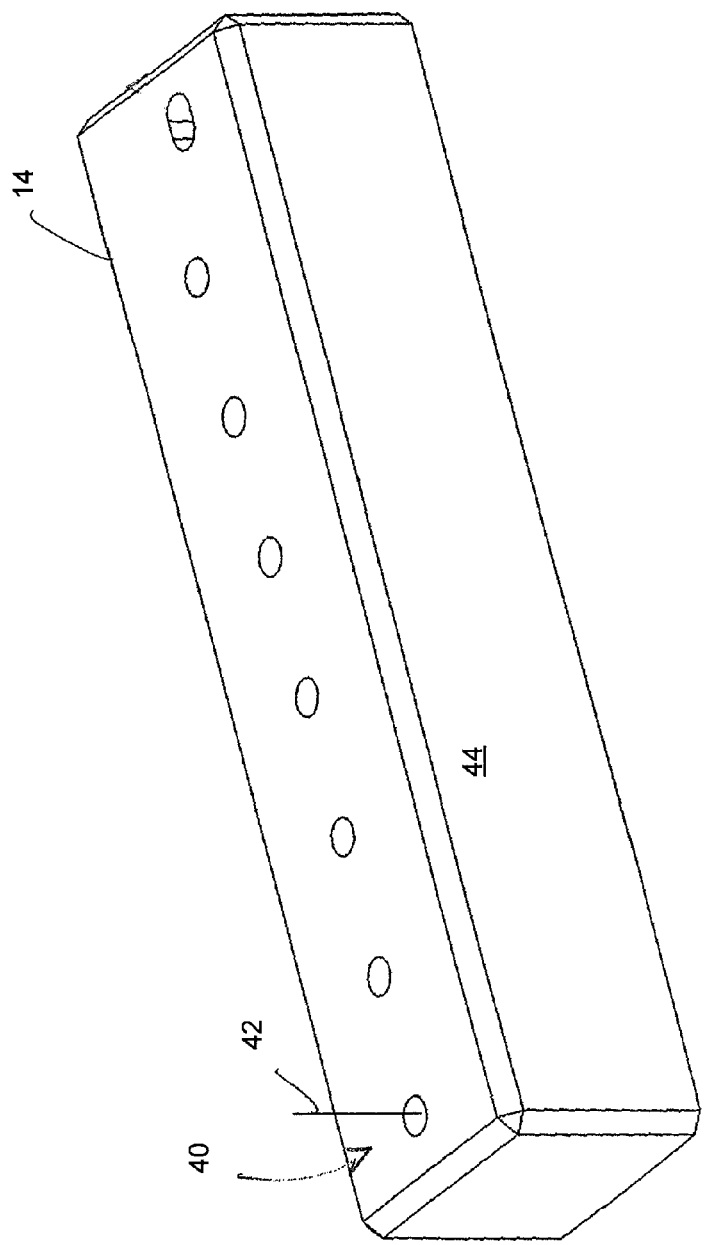
FIG. 6 is an example diagrammatic perspective side view of an alignment element of the fiber optic connector assembly of FIG. 1, according to one or more example implementations of the disclosure.
Figure 7:
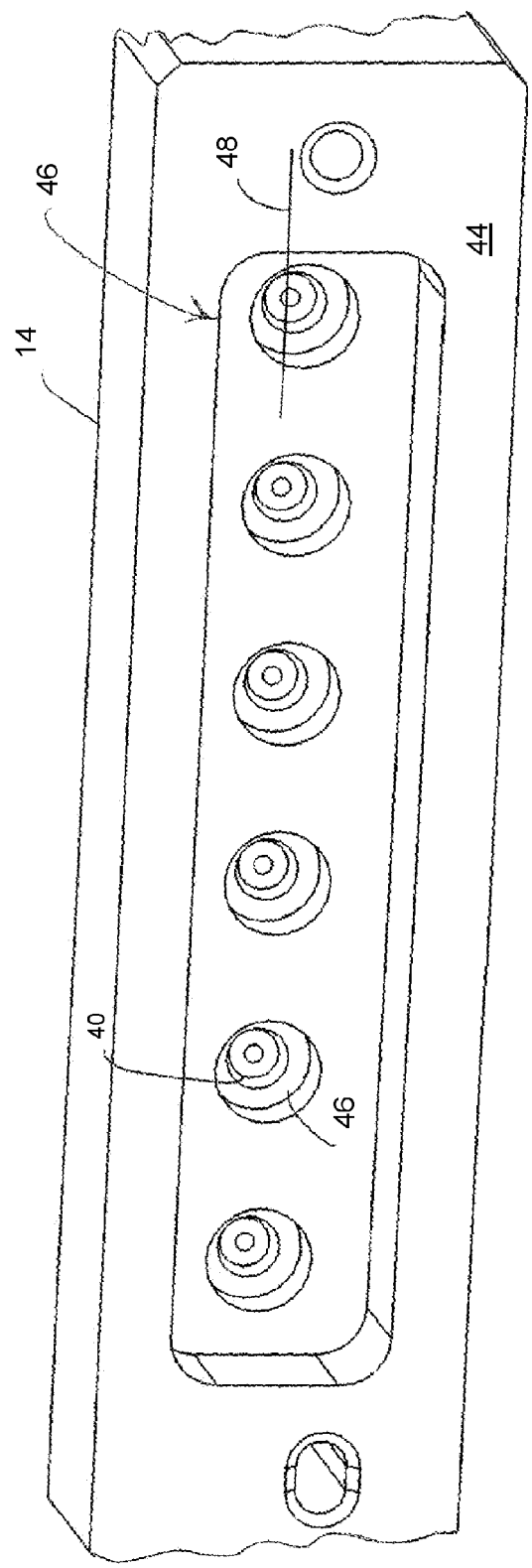
FIG. 7 is an example diagrammatic perspective bottom view of an alignment element of the fiber optic connector assembly of FIG. 1, according to one or more example implementations of the disclosure.
Figure 8:
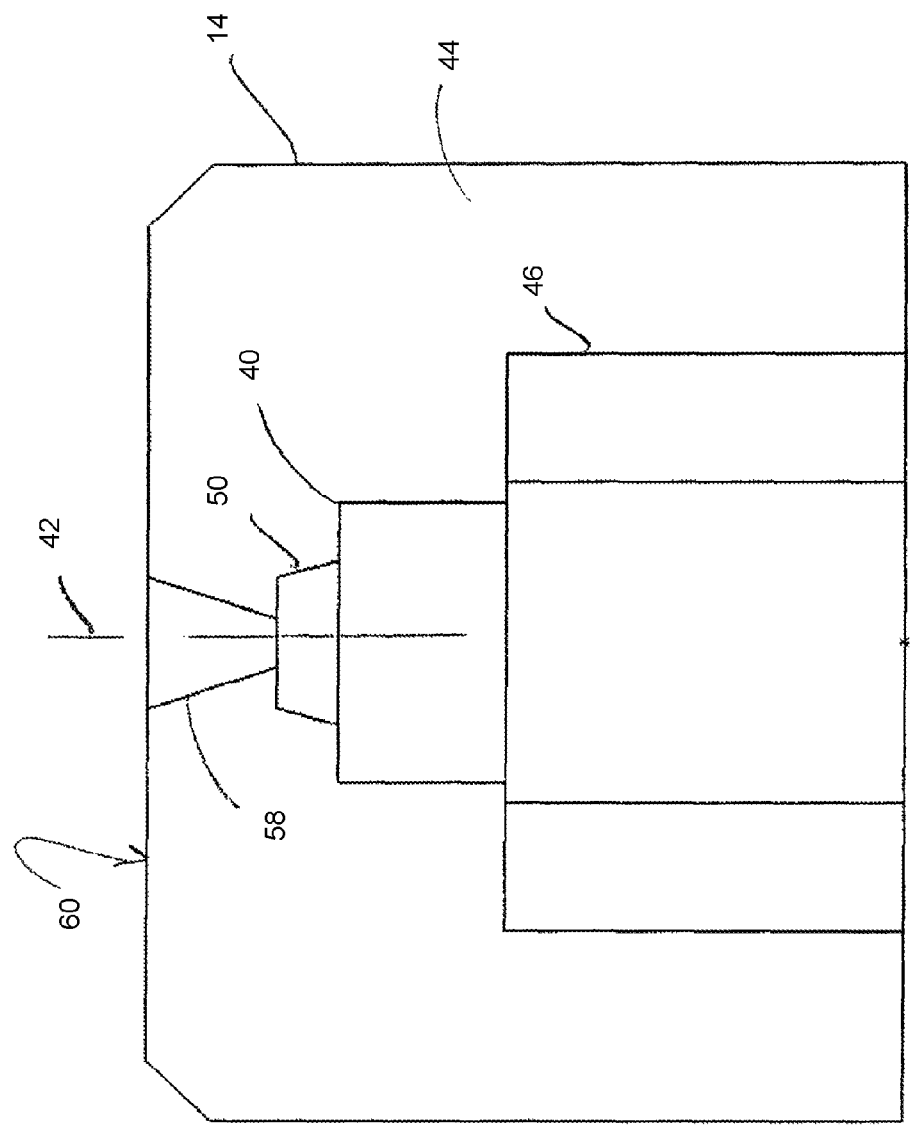
FIG. 8 is an example diagrammatic side sectional view of an alignment element of the fiber optic connector assembly of FIG. 1, according to one or more example implementations of the disclosure.
Figure 9:
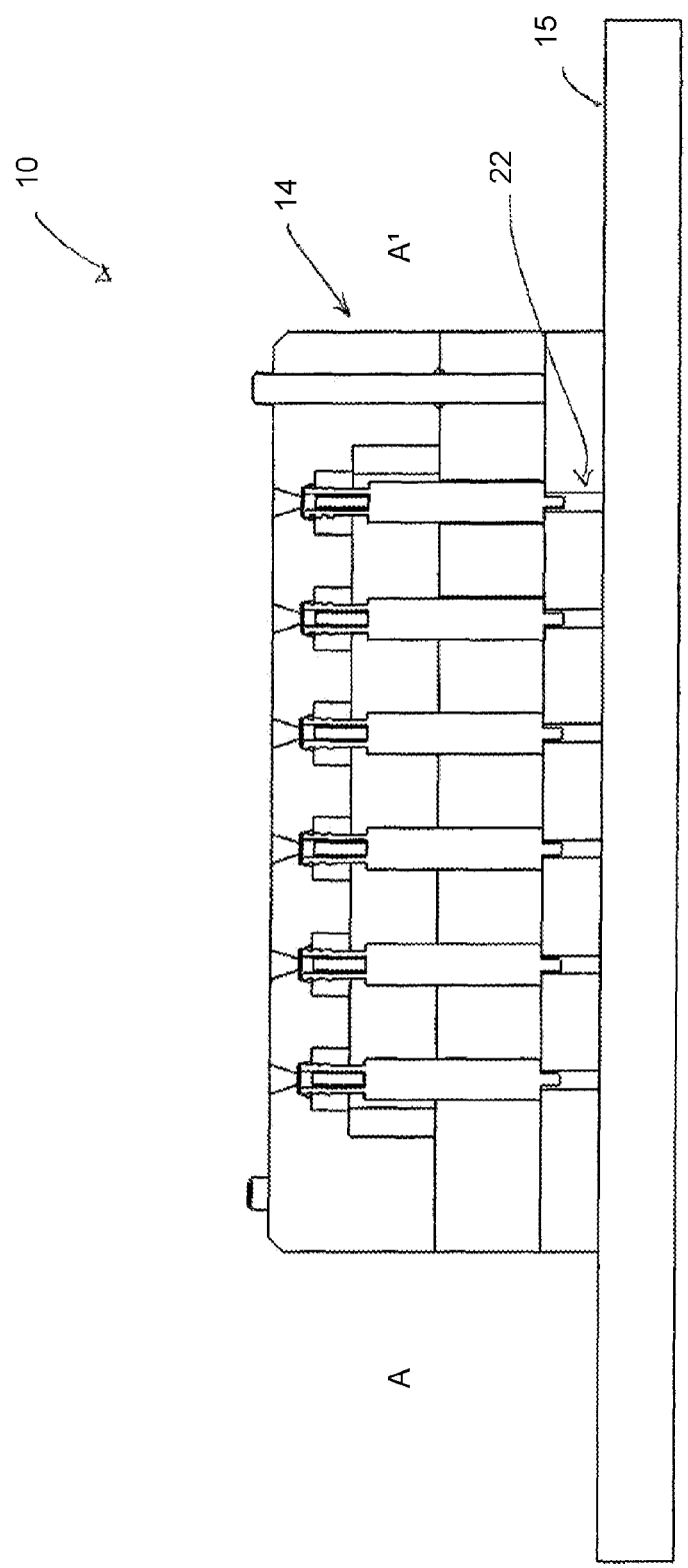
FIG. 9 is an example diagrammatic first side sectional view of the fiber optic connector assembly of FIG. 1, according to one or more example implementations of the disclosure.
Figure 10:
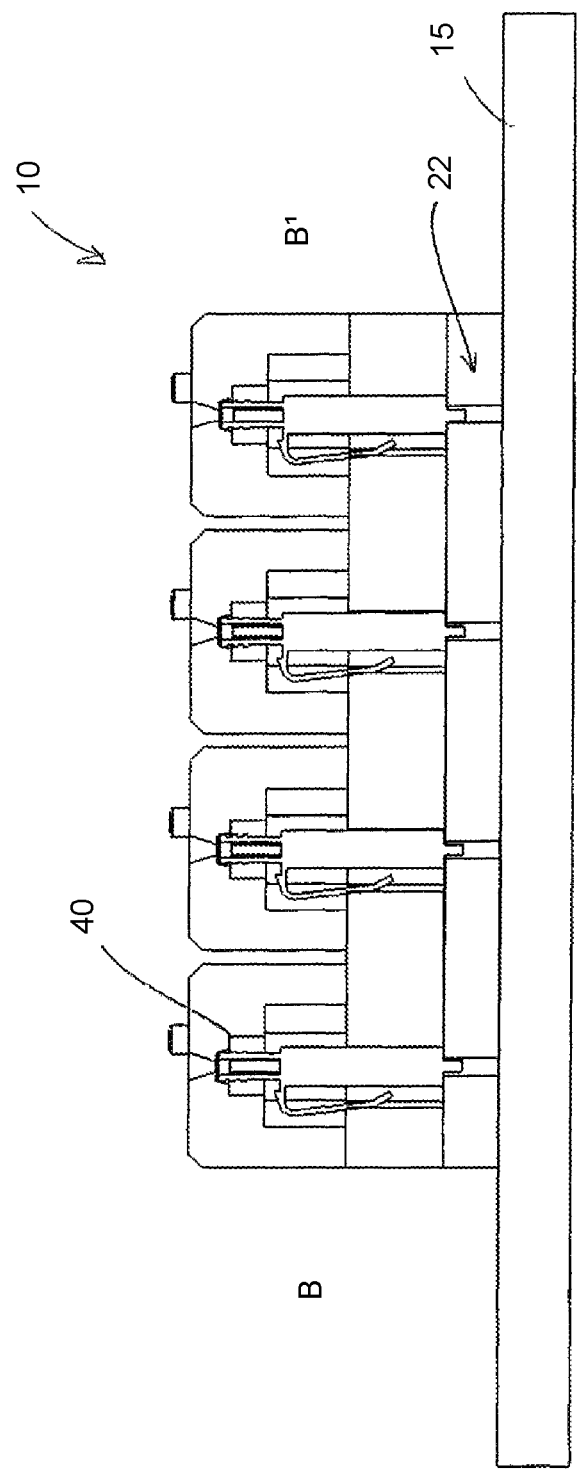
FIG. 10 is an example diagrammatic second side sectional view of the fiber optic connector assembly of FIG. 1, according to one or more example implementations of the disclosure.
Figure 11:
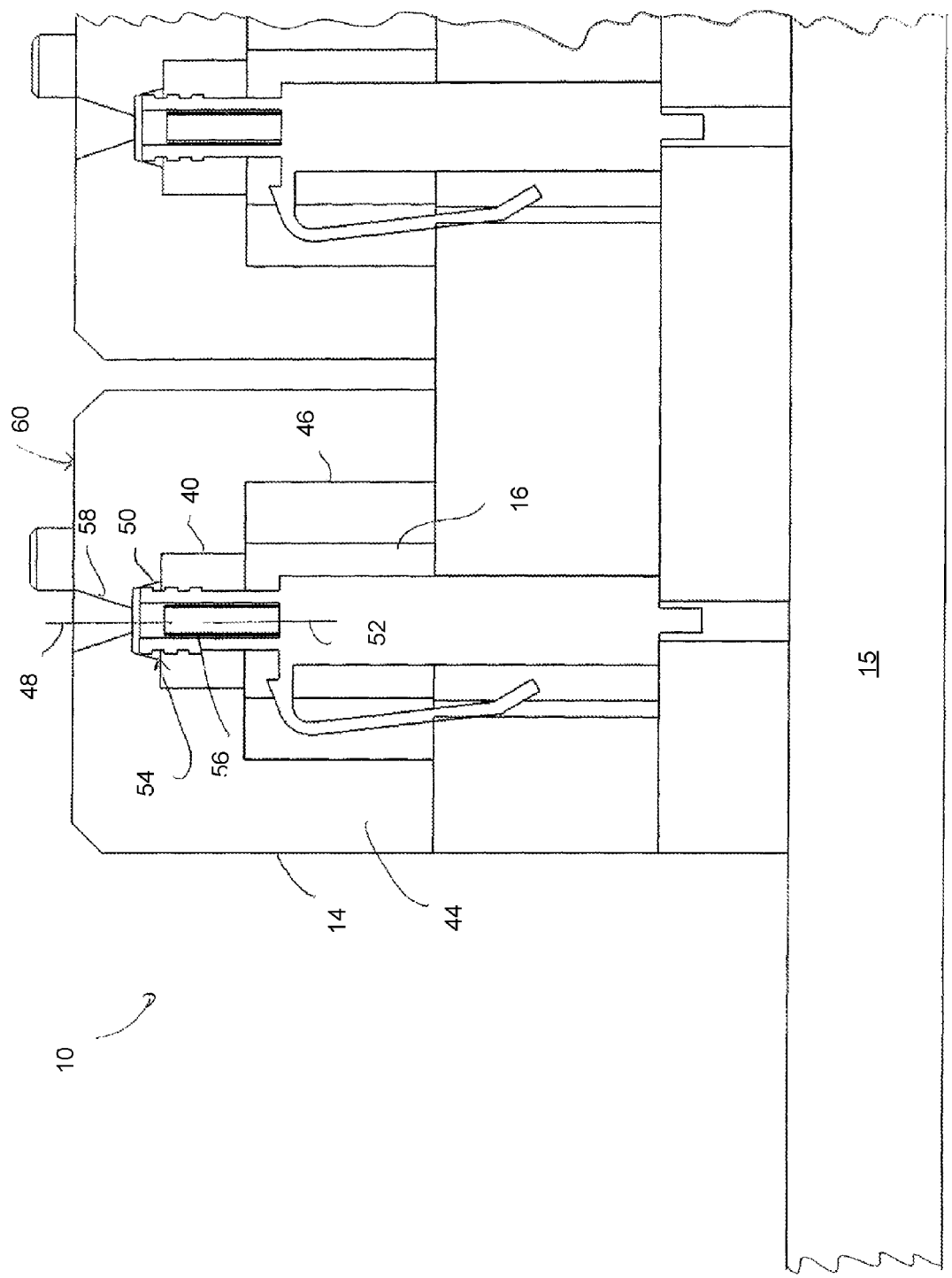
FIG. 11 is an example diagrammatic second side sectional view of the alignment element engaging a fiber optic connector, according to one or more example implementations of the disclosure.

In some implementations, and referring at least to FIGS. 1 and 2, base 12 may be configured to receive a number of alignment elements 14 corresponding to the number of columns of fiber optic connectors 16 carried by base 12. For example, as shown in FIG. 1, base 12 may be configured to carry four rows of fiber optic connectors 16 and, accordingly, may utilize four separate alignment elements 14 to longitudinally center corresponding connectors 16. The use of separate alignment elements 14 may minimize Y-axis 19 tolerance stack-up that may otherwise occur among adjacent openings 40, such as in a one-piece element having four rows of six openings. It will be appreciated that any number of alignment elements and/or a one-piece element may be used without departing from the scope of the disclosure.

In some implementations, base 12 may include opposing sets of posts (e.g., posts 60, 62) configured to insert within corresponding mounting openings (e.g., mount openings 64, 66) defined by the set of alignment elements. For example, base 12 may be configured to interact with each of alignment elements 14 to maintain consistent orientation of alignment elements 14 relative to fiber optic connectors 16. For instance, and referring at least to FIGS. 1 and 5, base 12 may include opposing sets of posts 60, 62 configured to insert within corresponding mounting openings 64, 66 defined by alignment elements 14. Posts 60, 62 and openings 64, 66 may be configured with a keying feature that may provide for mounting of alignment elements 14 relative to base 12 in a single orientation. For example, first posts 60 and first mounting openings 64 may be aligned on a first axis 70, while second posts 62 and second mounting openings 62 may be aligned on second axis 72 offset by a distance (e.g., distance 74) from first axis 70. The keying feature may allow for consistent positioning of alignment elements 14 relative to fiber optic connectors 16 during a ferrule filling procedure.

In some implementations, as noted above, a fiber optic connector manufacturing process may include but is not limited to carrying, by base 12, a set of fiber optic connectors (e.g., fiber optic connectors 16). Base 12 may carry a set of alignment elements (e.g., alignment elements 14). Each alignment element of the set of alignment elements may define an opening (e.g., opening 20). Each opening may be aligned with a corresponding fiber optic connector of the set of fiber optic connectors with a longitudinal axis (e.g., longitudinal axis 42) of the opening. A needle (e.g., needle 80) associated with an injector device may be aligned relative to the opening of a set of alignment elements. A material (e.g., epoxy-based resin) for fiber retention may be injected from the needle associated with the injector device in the opening. Aligning, by each opening, the corresponding fiber optic connector of the set of fiber optic connectors with the longitudinal axis of the opening may include aligning, by each opening, a longitudinal axis of a fiber optic connector ferrule (e.g., fiber optic connector ferrule 56) for the corresponding fiber optic connector with a longitudinal axis of the needle associated with the injector device.

Figure 12:
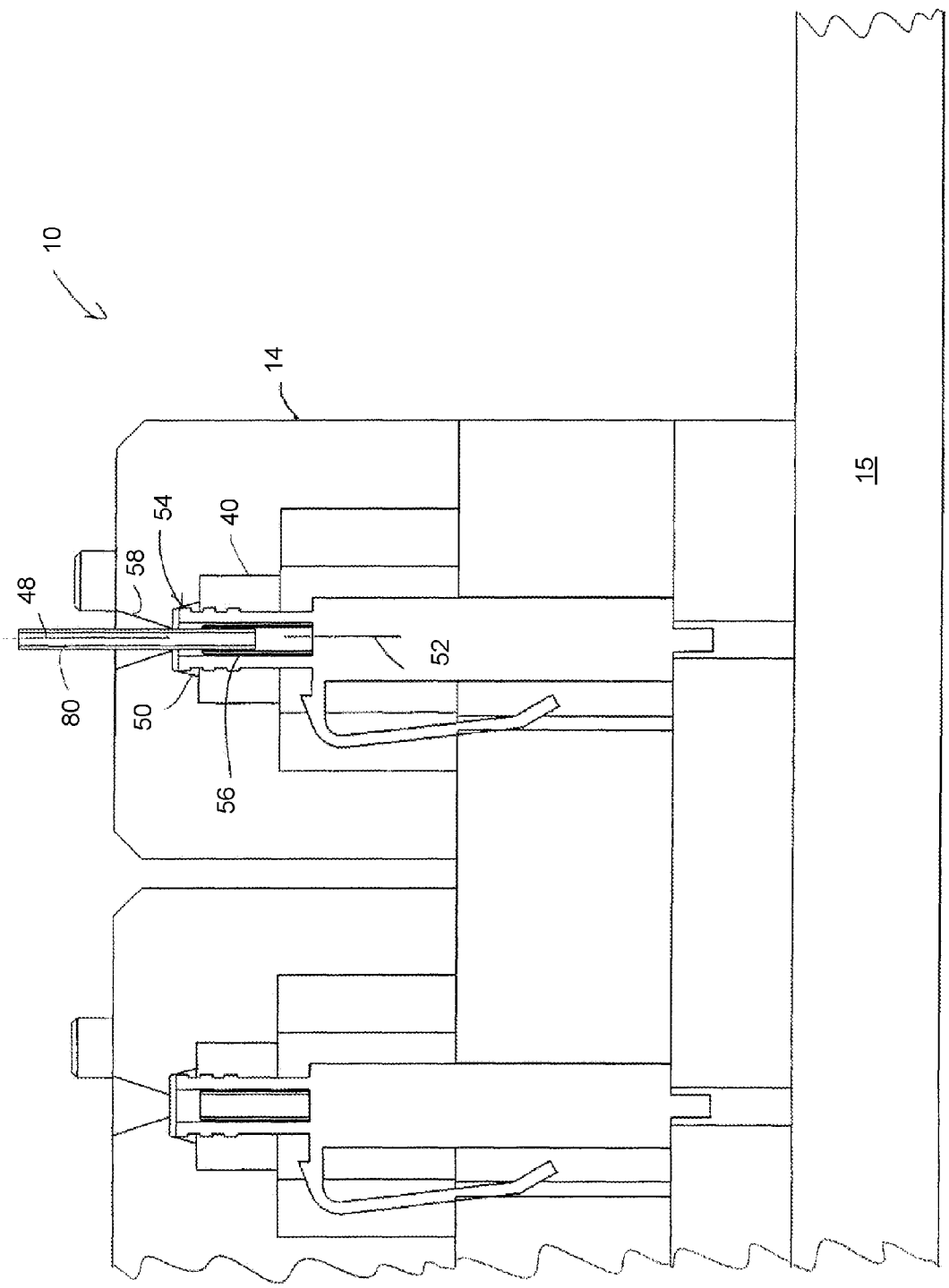
FIG. 12 is an example diagrammatic view of insertion of a needle into a ferrule of a fiber optic connector, according to one or more example implementations of the disclosure.
Figure 13:
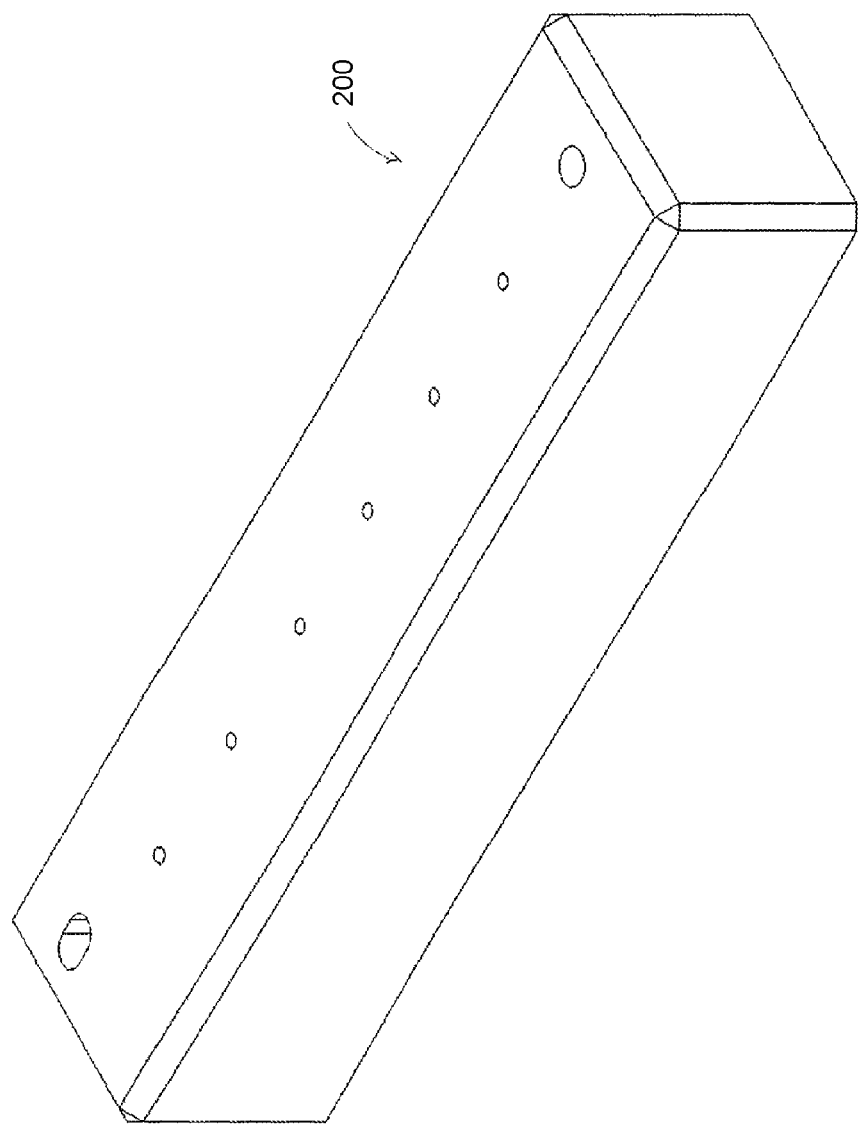
FIG. 13 is an example diagrammatic view of a preform assembly, according to one or more example implementations of the disclosure.
Figure 14:
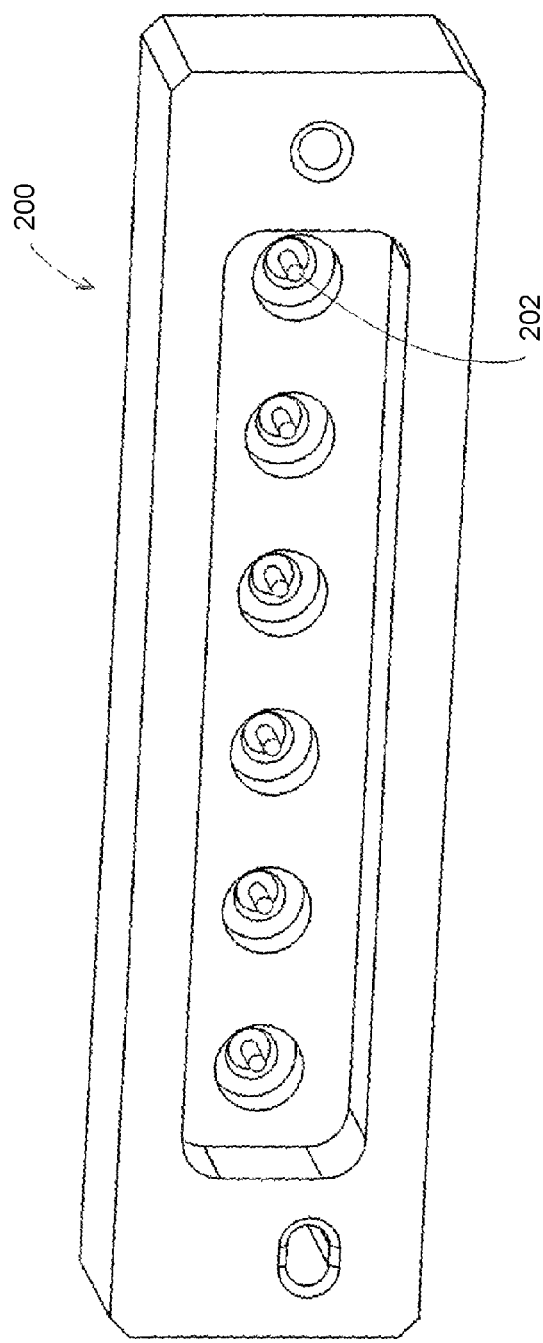
FIG. 14 is an example diagrammatic bottom view of the preform assembly of FIG. 13, according to one or more example implementations of the disclosure.
Figure 15:
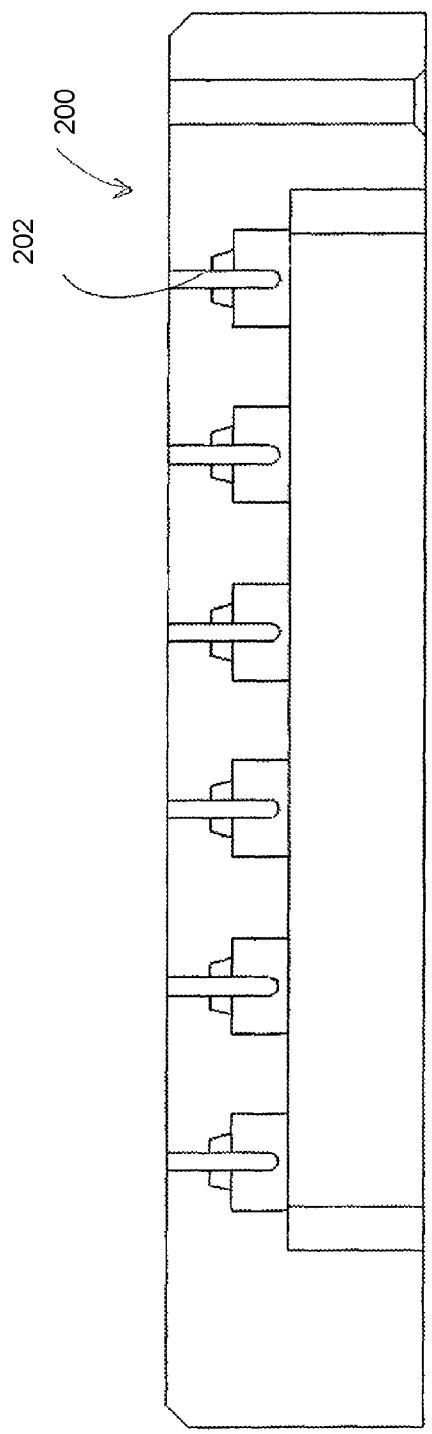
FIG. 15 is an example diagrammatic side sectional view of the preform assembly of FIG. 13, according to one or more example implementations of the disclosure.
Figure 16:
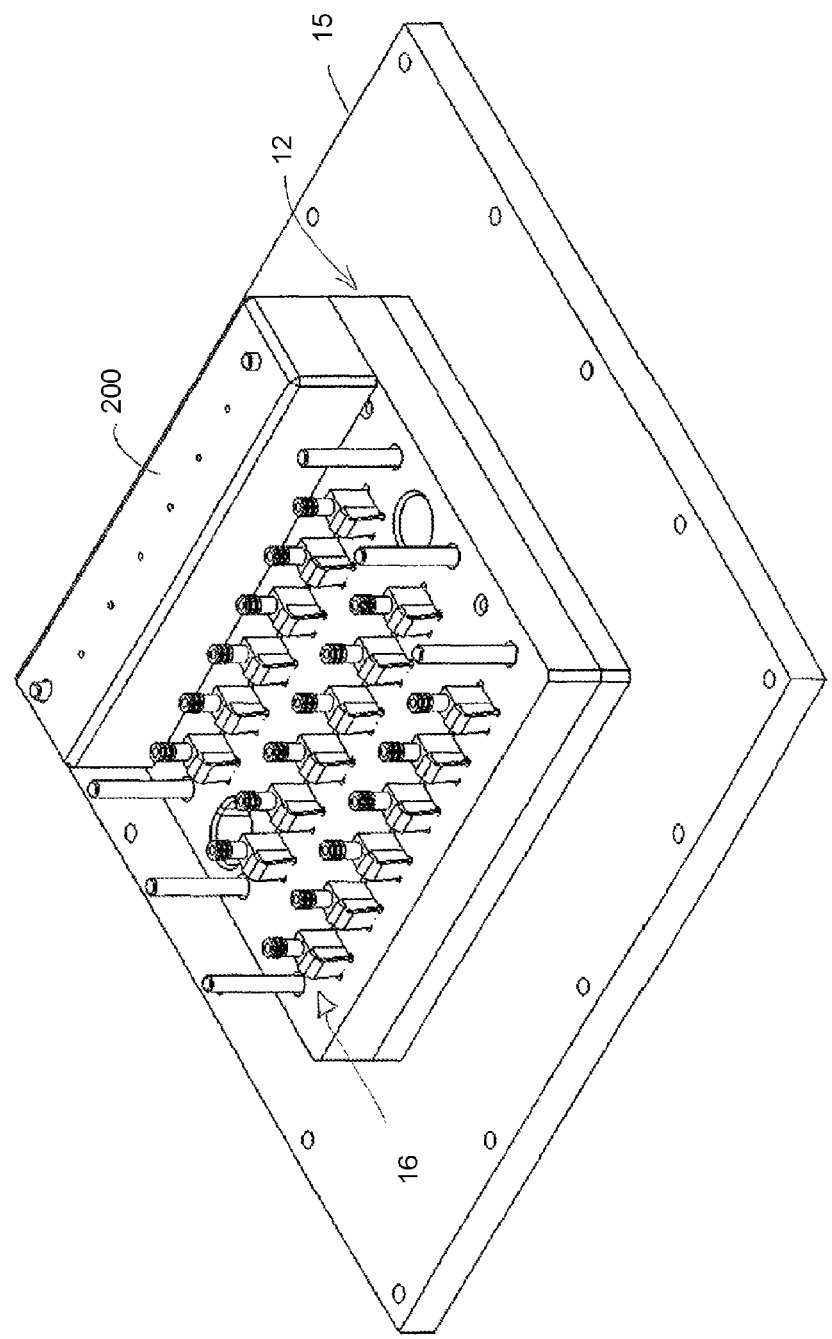
FIG. 16 is an example diagrammatic view of the preform assembly of FIG. 13 applied to a column of fiber optic connectors carried by the base of the fiber optic connector assembly jig of FIG. 1, according to one or more example implementations of the disclosure.

For example, and referring at least to FIG. 12, during a fiber optic connector manufacturing process, an injection device may position a needle (e.g., needle 80), such as a 19 gauge needle, relative to opening 40 of alignment element 14. As the injection device advances needle 80 into opening 40, injection device may inject a volume of epoxy into ferrule 56. During the dispensing process, as ferrule 56 becomes filled with epoxy, the dispensing device may at least partially withdraw needle 80 from ferrule 56 while continuing to inject the epoxy into ferrule 56. The partial withdrawal of needle 80 from ferrule 56 during the injection process may maintain an accurate amount of epoxy in ferrule 56.

As noted above, ferrules 56 of fiber optic connectors 16 may be manufactured from a (substantially) thin-walled compliant material. As such, ferrules 56 may be misshapen and may define a (substantially) non-circular (e.g., oblong or oval) cross-sectional shape. It will be appreciated that other cross-sectional shapes may be used. In some implementations, the irregular shape of ferrules 56 may cause the ferrules to be crushed by needle 80 as it enters the top of fiber optic connector 16.

Figure 17:
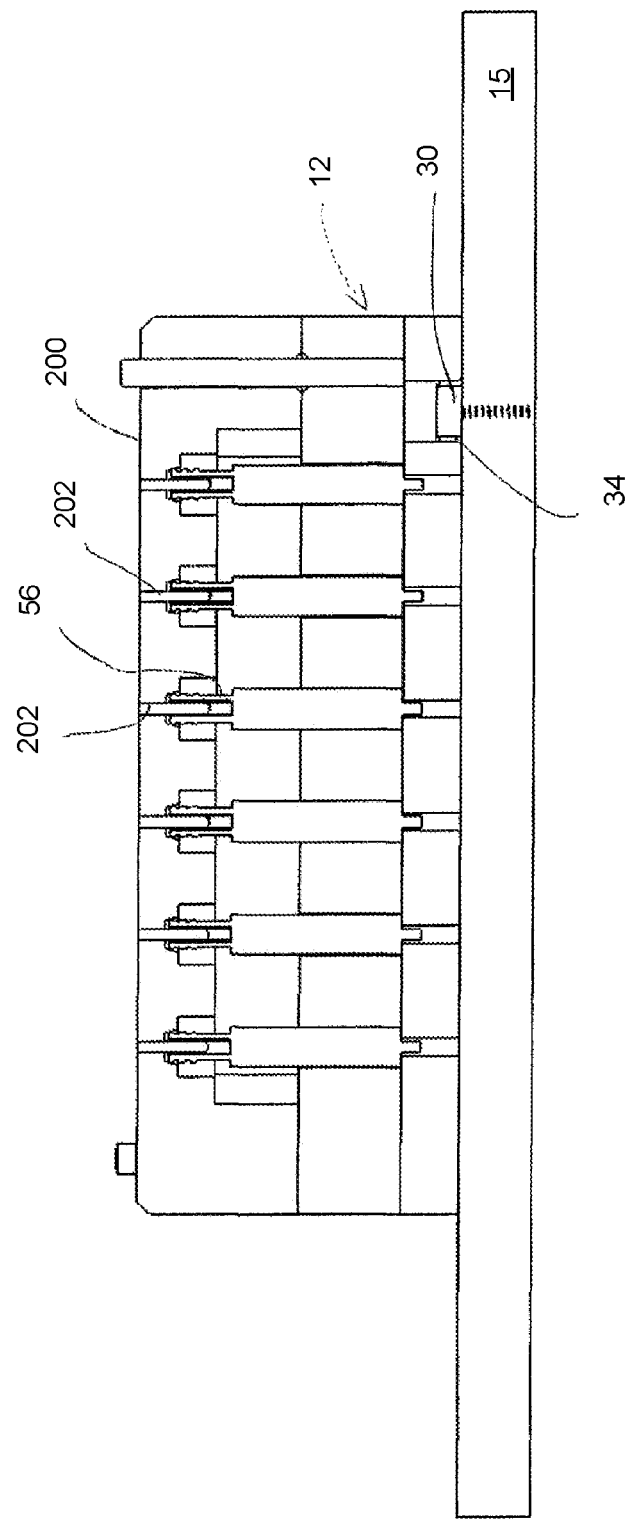
FIG. 17 is an example diagrammatic side sectional view of the preform assembly and base of a fiber optic connector assembly jig of FIG. 16, according to one or more example implementations of the disclosure.

In some implementations, a pin (e.g., pin 202) from a preform assembly (e.g., preform assembly 200) may be extended into the fiber optic connector ferrule for the corresponding fiber optic connector. For example, and referring at least to FIGS. 13-17, to help shape each of ferrules 56 of fiber optic connectors 16 to more readily accept needle 80, a manufacturer may utilize preform assembly 200, to (substantially) round the cross-sectional shape of ferrules 56. Preform assembly 200 may include a set of pins (e.g., pins 202) that may be configured to extend down onto the above-noted row(s) of fiber optic connectors 16 as the manufacturer positions preform assembly 200 relative to fiber optic connectors 16. Referring at least to FIG. 17, as the manufacturer lowers preform assembly 200 onto fiber optic connectors 16, each pin 202 may enter corresponding ferrule 56 and may cause ferrules 56 to take the shape of corresponding pins 202 after a given period of time. In some implementations, preform assembly 200, therefore, may minimize or eliminate misshapenness of ferrules 56, thereby minimizing or eliminating interference between needle 80 and ferrules 56 during an injection assembly.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A fiber optic connector assembly jig, comprising:
a base configured to carry a set of fiber optic connectors; and
a set of alignment elements carried by the base, each alignment element of the set of alignment elements defining an opening, each opening configured to center a corresponding fiber optic connector of the set of fiber optic connectors with a longitudinal axis of the opening; and
a base plate, wherein the base is configured to interact with the base plate to align the corresponding fiber optic connector relative to a fluid injection device.

2. The fiber optic connector assembly jig of claim 1 wherein the base includes a first portion defining the opening and a second portion defining a second opening.

3. The fiber optic connector assembly jig of claim 1 wherein the base includes one or more alignment portions configured to mate with at least one of the alignment elements to align the corresponding fiber optic connector relative to the injection device.

4. The fiber optic connector assembly jig of claim 3 wherein the base plate includes a keying element configured to insert within a corresponding key element opening defined by the base.

5. The fiber optic connector assembly jig of claim 3 wherein the at least one of the alignment elements includes a housing defining a channel extending along a vertical axis of the at least one of the alignment elements.

6. The fiber optic connector assembly jig of claim 3 wherein the at least one of the alignment elements includes a housing defining a set of openings which extend along a longitudinal axis of the at least one of the alignment elements.

7. The fiber optic connector assembly jig of claim 6 wherein at least one opening of the set of openings defines one of a bevel and taper extending from a face of the at least one of the alignment elements toward the corresponding fiber optic connector.

8. The fiber optic connector assembly jig of claim 6 wherein at least one opening of the set of openings defines one of a bevel and taper sized and shaped to receive a tip portion of the corresponding fiber optic connector.

9. The fiber optic connector assembly jig of claim 1 wherein the base includes opposing sets of posts configured to insert within corresponding mounting openings defined by the set of alignment elements.

10. A fiber optic connector assembly jig, comprising:
a base configured to carry a set of fiber optic connectors; and
a set of alignment elements carried by the base, each alignment element of the set of alignment elements defining an opening, each opening configured to center a corresponding fiber optic connector of the set of fiber optic connectors with a longitudinal axis of the opening; and
a base plate, wherein the base is configured to interact with the base plate to align the corresponding fiber optic connector relative to a fluid injection device, wherein the base includes one or more alignment portions configured to mate with at least one of the alignment elements to align the corresponding fiber optic connector relative to the fluid injection device.

11. The fiber optic connector assembly jig of claim 10 wherein the base includes a first portion defining the opening and a second portion defining a second opening.

12. The fiber optic connector assembly jig of claim 10 wherein the base plate includes a keying element configured to insert within a corresponding key element opening defined by the base.

13. The fiber optic connector assembly jig of claim 10 wherein the at least one of the alignment elements includes a housing defining a channel extending along a vertical axis of the at least one of the alignment elements.

14. The fiber optic connector assembly jig of claim 10 wherein the at least one of the alignment elements includes a housing defining a set of openings which extend along a longitudinal axis of the at least one of the alignment elements.

15. The fiber optic connector assembly jig of claim 14 wherein at least one opening of the set of openings defines one of a bevel and taper extending from a face of the at least one of the alignment elements toward the corresponding fiber optic connector.

16. The fiber optic connector assembly jig of claim 14 wherein at least one opening of the set of openings defines one of a bevel and taper sized and shaped to receive a tip portion of the corresponding fiber optic connector.

17. The fiber optic connector assembly jig of claim 10 wherein the base includes opposing sets of posts configured to insert within corresponding mounting openings defined by the set of alignment elements.

18. A fiber optic connector manufacturing process comprising:
- carrying, by a base, a set of fiber optic connectors;
- carrying, by the base, a set of alignment elements;
- defining, by each alignment element of the set of alignment elements, an opening;
- aligning, by each opening, a corresponding fiber optic connector of the set of fiber optic connectors with a longitudinal axis of the opening;
- aligning a needle associated with an injector device relative to the opening of a set of alignment elements; and
- injecting, from the needle associated with the injector device, a material for fiber retention in the opening.

19. The fiber optic connector manufacturing process of claim 18 wherein aligning, by each opening, the corresponding fiber optic connector of the set of fiber optic connectors with the longitudinal axis of the opening includes aligning, by each opening, a longitudinal axis of a fiber optic connector ferrule for the corresponding fiber optic connector with a longitudinal axis of the needle associated with the injector device.

20. The fiber optic connector manufacturing process of claim 19 further comprising extending a pin from a preform assembly into the fiber optic connector ferrule for the corresponding fiber optic connector.

* * * * *